Jan. 17, 1956  L. H. WEBER  2,731,135
CAN BODY CONVEYOR WITH ADJUSTABLE RAILS
Filed Aug. 26, 1952
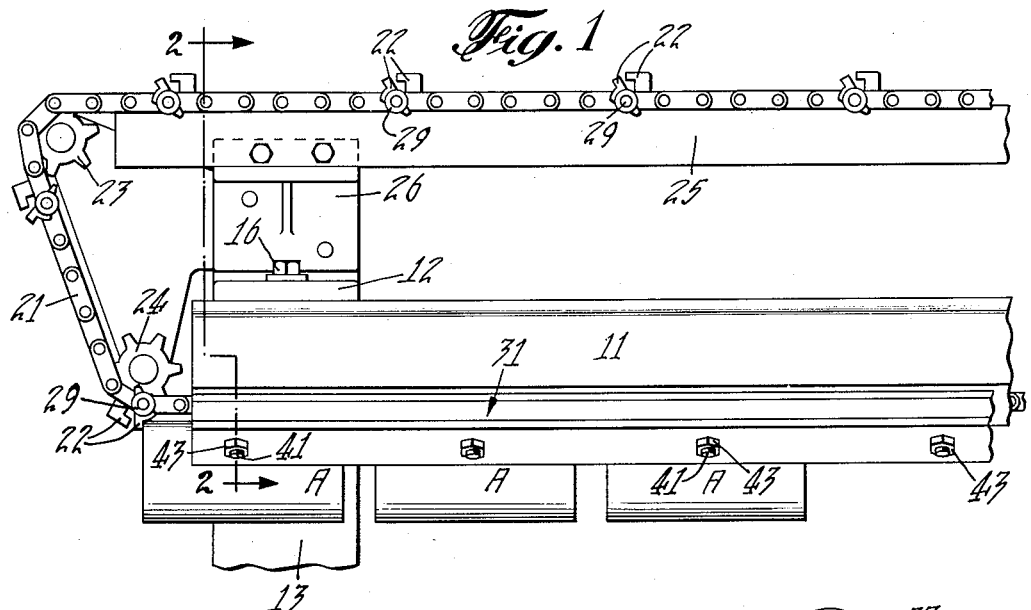
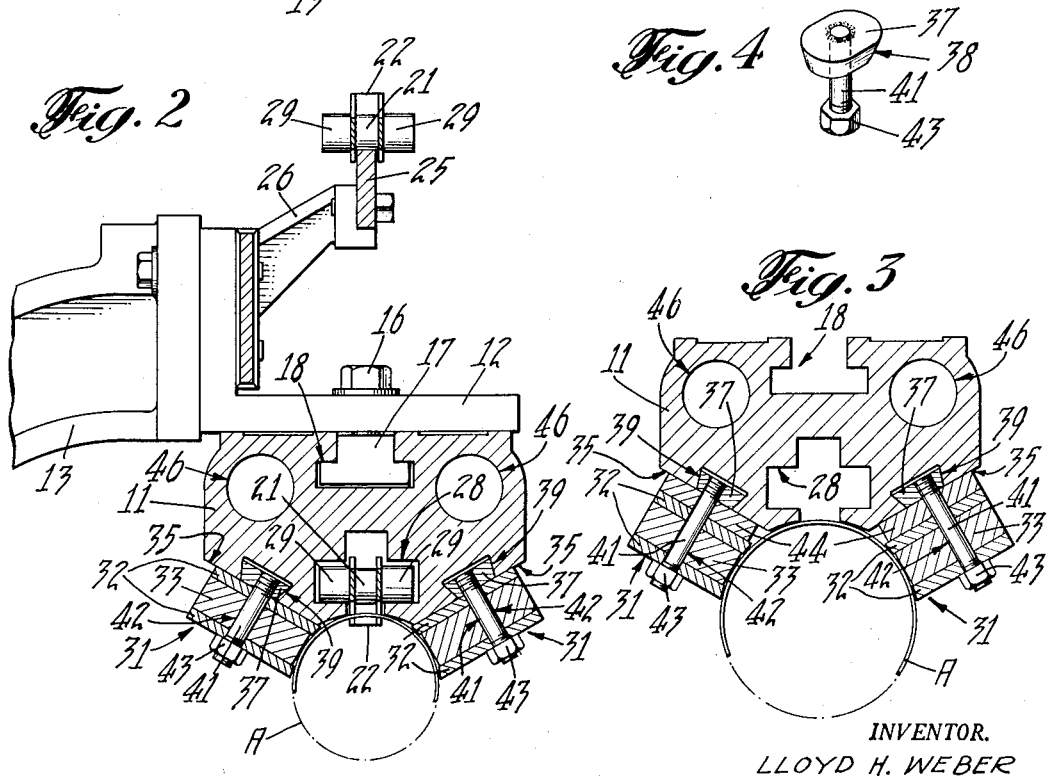
INVENTOR.
LLOYD H. WEBER
BY Charles H. Erne
Leland R. McCann
George W. Reiber
ATTORNEYS

United States Patent Office 2,731,135
Patented Jan. 17, 1956

2,731,135

CAN BODY CONVEYOR WITH ADJUSTABLE RAILS

Lloyd H. Weber, Newark, N. J., assignor to American Can Company, New York, N. Y., a corporation of New Jersey Application August 26, 1952, Serial No. 306,335

4 Claims. (Cl. 198—179)

The present invention relates to a can body treating machine having magnetic rails for supporting sheet metal can bodies to be treated and has particular reference to reversible devices for securing the rails to the machine in different positions for different diameter can bodies. This is a companion application to copending United States applications Serial Number 306,415 filed August 26, 1952, for Can Body Support with Conveyor Wearing Tracks, Serial No. 306,416, filed August 26, 1952, for Can Body Support Aligning Device, and Serial No. 306,418, filed August 26, 1952, for Can Body Making Machine with Improved Body Support Member, all of which are in the name of John E. Socke.

In the manufacture of sheet metal containers or cans several different kinds of machines are used in which partially completed cans or can parts are conveyed along a predetermined path of travel while suspended or otherwise supported or guided by magnetic rails. Such magnetic rails generally are used in pairs disposed in spaced relation and usually are secured by bolts to a rigid support member, the support member and the rails constituting a so-called horn or mandrel.

Frequently the magnetic rails are made as change parts for different diameters of cans or are slotted or otherwise arranged for adjustment by the loosening or the complete removal and replacement of the bolts which secure the rails to the support member. Where the support member is made of iron or steel or some other relatively hard material, the loosening or removal and replacement of the bolts, which usually are threadedly secured in the member, result in little or no damage to the threads in the support member and therefore in no way effects the usual adjustments required for the efficient operation of the machine.

Recently it has been found that an extruded support member, preferably made of a soft material, such as aluminum, aluminum alloys, magnesium, etc. which can be readily extruded from a die, is much superior in many ways to the relatively harder material such as iron or steel. However, such an extruded soft material is not suitable to the inclusion of screw threads which must be used frequently to provide for the adjustment of the magnetic rails. The screw threads in such soft material readily wear out or crumble away and are substantially destroyed upon frequent use.

The instant invention contemplates overcoming this difficulty by the provision of novel clamping devices which secure the magnetic rails to such a soft metal horn member.

An object of the invention is the provision in a can body treating machine having magnetic rails for supporting sheet metal can bodies to be treated, of rail attaching devices wherein the rails are secured in place by quickly removable clamping blocks which fit within clamping recesses formed in an extruded horn member so that the use of screw threads in the extruded horn member for the adjustment or replacement of the rails may be eliminated.

Another object is the provision of such rail attaching devices wherein the clamping blocks are reversible in the clamping recesses so that the magnetic rails may be relocated in a different position on the same extruded horn member for a different size can body.

Numerous other objects and advantages of the invention will be apparent as it is better understood from the following description, which, taken in connection with the accompanying drawings, discloses a preferred embodiment thereof.

Referring to the drawings:

Figure 1 is a fragmentary side elevation of principal parts of a can body treating machine embodying the instant invention;

Figs. 2 is an enlarged transverse sectional view taken substantially along the broken line 2—2 in Fig. 1, with parts broken away;

Fig. 3 is a view similar to Fig. 2, the view showing certain of the parts in a different position for a different size can body; and Fig. 4 is a perspective view of one of the clamping blocks used in the machine.

As a preferred or exemplary embodiment of the invention the drawings illustrate principal parts of a can body side seam soldering machine of the character disclosed in United States Patent 1,338,716 issued May 4, 1920 to Magnus E. Widell on Soldering Machine. In such a machine the can bodies to be treated are propelled along a straight line path of travel in a substantially continuous procession and in end-to-end spaced and timed relation, the can bodies being supported in an outside horn or mandrel for the various operations performed on them.

In the instant invention the drawings show an improved horn or mandrel unit which includes a one-piece extruded aluminum horn member 11 which extends longitudinally of the machine for its entire length. This member is suspended from a plurality of spaced angle brackets 12 secured to arms 13 which extend up from the frame of the machine at intervals along its length. The horn member 11 preferably is held in place by bolts 16 which extend through holes in the angle brackets 12 and which are threadedly engaged in T-shaped blocks 17 disposed in a T-slot 18 formed in the top of the extruded horn member.

Cylindrical can bodies A are propelled along the horn member 11 in the usual spaced and processional order, by an endless chain conveyor 21 having conventional can body gripper dogs 22 secured thereto at spaced intervals along the chain for engagement behind each can body in the procession. The conveyor 21 operates over vertically spaced sprockets 23, 24 disposed at each end of the machine and is actuated in any suitable manner, preferably as shown in the above mentioned Widell patent.

The upper run of the conveyor 21, intermediate the ends of the machine, rides on and is supported by a stationary support bar 25 which is secured to small brackets 26 attached to the angle brackets 12. The lower run of the conveyor 21 operates in a slot or track 28 of cruciform cross-section formed in the bottom of the horn member 11. Rollers 29 secured to both sides of the conveyor 21 adjacent the gripper dogs 22 ride on the horizontal legs of the slot 28 and thus support the conveyor, while the gripper dogs 22 depend below the horn member for engagement with and for propelling the can bodies along the horn member.

The propelled can bodies A are supported by a pair of permanent magnet support rails 31 which converge towards each other and extend along the entire length of the horn member 11. Each rail comprises a pair of spaced and parallel pole plates 32 with a core plate 33 disposed between them and secured together to provide a unitary structure. These magnetic rails 31 are located one on each side of the conveyor track 28 in the horn member and are disposed at a predetermined angle so as to radially engage and hold in suspension can bodies A of a predetermined diameter. For this purpose the magnetic rails 31 are secured to tapered faces 35 formed on the bottom of the horn member 11.

In order to secure the magnetic rails 31 tightly to the tapered faces 35 of the relatively soft aluminum horn member 11 so that they will be rigid and accurately located, while still providing for their frequent removal and replacement for a different size of can body, the rails are clamped against the tapered faces 35 by wedge blocks or wedge shaped clamp blocks 37 (Figs. 2, 3 and 4) having converging tapered sides 38 which are disposed in longitudinal dovetail grooves or recesses 39 formed in the horn member 11 adjacent its tapered faces 35 and extending the full length of the horn member. These clamp blocks 37 are slidable along the grooves 39 and are removable therefrom.

Each clamp block 37 carries a clamping stud 41 which projects outwardly and extends through a close fitting clearance hole 42 formed in the magnetic rails 31. Beyond the rails, each stud 41 carries a clamping element such as a nut 43 threadedly secured to the stud for drawing its clamp block 37 and the magnetic rail 31 toward each other to tightly clamp the rail against the adjacent tapered face 35 of the horn member 11.

Each clamping stud 41 preferably is threadedly secured in its clamp block 37. It should be noted, however, that the stud 41 is located eccentrically or off-center in the clamp block 37 so that when the block is in its holding groove 39 its stud 41 is located nearer one edge of the groove than the other. This eccentric location of the clamping studs 41 in their clamp blocks 37 provides for a relocation of the magnetic rails 31 for a different size can body A without in any manner damaging the soft aluminum horn member 11.

In the drawings Fig. 2 shows the relative position of the clamp blocks 37 and the magnetic rails 31 for a small diameter can body A while Fig. 3 shows the relative position of the same clamp blocks 37 and the same magnetic rails 31 for a larger diameter can body A. This relocation of the magnetic rails 31 is effected by loosening the clamping nuts 43 on the studs 41 of the clamp blocks 37 and removing and reversing or turning the blocks through an angle of 180 degrees and reinserting them in clamping position in their grooves for tightening by the nuts 43. This reversal of the clamp blocks 37 spreads the magnetic rails apart radially of the can body and thus provides for the accommodation of a large diameter can body A. In order to maintain the relocated magnetic rails 31 in a radial position relative to the longitudinal axis of the larger diameter can body A, a shim or spacer element 44 (Fig. 3) is interposed between the magnetic rail and the tapered face 35 of the horn member 11.

In this manner the magnetic rails 31 are tightly and accurately secured to the relatively soft aluminum horn member 11 and are removable and replaceable or relocatable, without in any manner damaging the horn member. Such a manner of attaching the rails 31 to the horn member 11 facilitates the use of the improved one-piece extruded horn member in which the dovetail grooves 39, the conveyor track or slot 28, the T-slot 18 and water cooling conduits 46 may be formed simultaneously in the horn member while the member is being extruded.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A magnetic support for a can body treating machine, comprising a longitudinal horn member including a pair of spaced converging magnetic rails extending along said horn member for magnetically supporting between them can bodies arranged in endwise relation, a plurality of longitudinal recesses disposed in transversely spaced relation within said horn adjacent said magnetic rails, a plurality of eccentric clamp elements removably carried by and longitudinally insertable within said recesses, said clamp elements being reversible end for end and longitudinally insertable in said clamping recesses for securing said rails in another position on said horn member for a different diameter can body, a pair of shim elements respectively interposed between said horn member and said rails for maintaining the latter in radially disposed relation to the longitudinal axis of said can body of different diameter, and means for drawing said clamp elements and said rails toward each other to tightly clamp said rails against said horn member.

2. A magnetic support for a can body treating machine, comprising a longitudinal horn member including a pair of spaced converging magnetic rails extending along said horn member for magnetically supporting between them can bodies arranged in endwise relation, a plurality of longitudinal recesses disposed in transversely spaced relation within said horn member adjacent said rails, a plurality of clamp blocks removably and respectively carried in said recesses, a clamping stud projecting outwardly from and disposed eccentrically of each of said clamp blocks, said studs extending through said rails, a clamping element attached to each of said studs for drawing said clamp blocks and said rails toward each other to tightly clamp said rails against said horn member, said clamp blocks being reversible end for end and longitudinally insertable in said clamping recesses for securing said rails in another position on said horn member for a different diameter can body, and a pair of shim elements respectively interposed between said horn member and said rails for maintaining the latter in radially disposed relation to the longitudinal axis of said different diameter can body.

3. A magnetic support for a can body treating machine, comprising a longitudinal horn member including a pair of spaced converging magnetic rails extending along said horn member for magnetically supporting between them can bodies arranged in endwise relation, a pair of longitudinal dovetail grooves disposed in transversely spaced relation within said horn member adjacent said rails respectively, a plurality of wedge shaped clamp blocks removably carried in each of said grooves, a clamping stud projecting outwardly from and disposed eccentrically of each of said clamp blocks, said studs extending through said rails and each stud having a nut threadedly engaged with its outer end for drawing said clamp blocks and said rails toward each other to tightly clamp said rails against said horn member, said clamp blocks being reversible end for end and longitudinally insertable in said dovetail grooves for securing said rails in another position on said horn member for a different diameter can body, and a pair of shim members respectively insertable between said horn member and said rails for maintaining the latter in radially disposed relation to the longitudinal axis of said different diameter can body.

4. A can treating machine comprising a longitudinal horn member including a pair of spaced converging magnetic rails extending along said horn member for magnetically supporting between them can bodies advancing in endwise relation, a conveyor for advancing the can bodies, a plurality of longitudinal recesses disposed in transversely spaced relation within said horn adjacent said magnetic rails, a plurality of eccentric clamp elements removably carried by and longitudinally insertable within said recesses, said clamp elements being reversible end for end and longitudinally insertable in said clamping recesses for securing said rails in another position on said horn member for a different diameter can body, a pair of shim elements respectively interposed between said horn member and said rails for maintaining the latter in radially disposed relation to the longitudinal axis of said can body of different diameter, and means for drawing said clamp elements and said rails toward each other to tightly clamp said rails against said horn member.

References Cited in the file of this patent

UNITED STATES PATENTS

| | | |
|---|---|---|
| 1,534,677 | Assmann | Apr. 21, 1925 |
| 2,039,338 | Nordquist | May 5, 1936 |
| 2,348,495 | Peterson | May 9, 1944 |
| 2,491,616 | Laxo | Dec. 20, 1949 |
| 2,660,969 | Woolford | Dec. 1, 1953 |